United States Patent
Nakamura et al.

(10) Patent No.: US 6,653,594 B2
(45) Date of Patent: Nov. 25, 2003

(54) CONSUMABLE ELECTRODE GAS SHIELDED ARC WELDING METHOD AND APPARATUS

(75) Inventors: Terumi Nakamura, Ibaraki (JP); Kazuo Hiraoka, Ibaraki (JP); Chiaki Shiga, Ibaraki (JP); Hideyuki Yamamoto, Osaka (JP); Koji Nakamura, Tokyo (JP)

(73) Assignees: Japan as represented by Director General of Ministry of Education, Culture, Sports, Science and Technology National Research Institute for Metals, Ibaraki (JP); Daihen Corporation, Osaka (JP); Nippon Sanso Corporation, Tokyo (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/793,991

(22) Filed: Feb. 28, 2001

(65) Prior Publication Data

US 2001/0025832 A1 Oct. 4, 2001

(30) Foreign Application Priority Data

Feb. 29, 2000 (JP) ......................................... 2000-054973

(51) Int. Cl.$^7$ ................................................. B23K 9/173
(52) U.S. Cl. .................................... 219/137 PS; 219/74
(58) Field of Search .............................. 219/74, 130.51, 219/137 PS, 137 R (56) References Cited

U.S. PATENT DOCUMENTS 3,484,575 A * 12/1969 Cunningham ................. 219/74

FOREIGN PATENT DOCUMENTS

RU 2008153 * 2/1994 .............. 219/137 R

* cited by examiner

Primary Examiner—Clifford C. Shaw
(74) Attorney, Agent, or Firm—Wenderoth, Lind & Ponack, L.L.P.

(57) ABSTRACT

A gas having an arc current-voltage property that is different from a shielding gas is intermittently added to the shielding gas, an arc current is intermittently changed in proportion to an intermittent chemical composition change of the shielding gas at an arc generation region, and an arc generation point situated at a tip of a welding wire is displaced upwardly or downwardly along a groove of a base metal.

8 Claims, 8 Drawing Sheets

CONSUMABLE ELECTRODE GAS SHIELDED ARC WELDING METHOD AND APPARATUS

FIELD OF THE INVENTION

The present invention relates to a consumable electrode gas shielded arc welding method and apparatus. More particularly, the present invention relates to a consumable electrode gas shielded arc welding method and apparatus, which realize appropriate arc heat input density distributions in a groove of a base metal and preserve satisfactory toughness of a weld metal.

DESCRIPTION OF THE PRIOR ART

In order to prevent weld defects, such as lack of fusion at a bottom of a groove or formation of convex beads in the groove during root running or multi-layer welding of a very narrow groove of a metal joint, which groove has a V or Y shape and a groove angle of about 30° or an I or U shape and a clearance of about 5 mm, it is necessary to realize an effective arc heat input density distribution.

A consumable electrode gas shielded arc welding method, which is excellent in efficiency because wide throat thickness is obtained by a single operation, is not exceptional. Strong arc power that can melt a bottom of a groove against an excessively heavy gravity head of molten metal is needed, and large electric current is demanded.

MIG welding, which uses as a shielding gas an inert gas such as argon, or a mixed gas in which an oxidizing gas such as $O_2$ from 2 to 5% or $CO_2$ of less than 20% is a main ingredient and is added to an inert gas, cannot afford such requirements. This is so because the MIG welding basically is concerned with current savings and heat input savings and because a condition range which realizes free defect welding of a bottom of a groove is narrow.

On the other hand, the MIG welding is very effective for beads. Stable and fine melting is indispensable for preserving a wetting property at a toe of the beads. A cathode cleaning action of the MIG welding, which is remarkably confirmed for a wide range of the shielding gas, is also effective for stable and fine melting of the toe.

MAG welding which uses an oxidizing gas usually uses Ar+20% $CO_2$ for a shielding gas, and its condition range for which free defect welding at a bottom of a groove is realized is very narrow. Consequently, $CO_2$ welding which uses 100% $CO_2$ is demanded.

With the use of an oxidizing shielding gas, it is, however, known that toughness of weld metal is deteriorated. Because of this, decrease of a mixing ratio of the oxidizing gas such as $O_2$ and $CO_2$ is required for preserving sufficient toughness of the weld metal.

The present invention has an object to provide a consumable electrode gas shielded arc welding method and apparatus, which realize appropriate arc heat input density distributions in a groove of a base metal and preserve satisfactory toughness of a weld metal.

This and other objects, features and advantages of the invention will become more apparent upon a reading of the following detailed specification and drawings, in which:

DETAILED DESCRIPTION OF THE INVENTION

According to a broad aspect of the present invention, there is provided a consumable electrode gas shielded arc welding method, comprising the steps of intermittently adding a gas to a shielding gas, wherein the gas has an arc current-voltage characteristic that is different from that of the shielding gas, intermittently changing an arc current in proportion to an intermittent chemical composition change of the shielding gas at an arc generation region, and displacing an arc generation point situated at a tip of a welding wire upwardly or downwardly along a groove of a base metal.

With respect to the consumable electrode gas shielded arc welding method, the present invention provides preferable modifications as follows: the shielding gas, or the gas added to the shielding gas, is an oxidizing gas or He; and variation of the arc current is increased or decreased by changing an external characteristic of a weld electric power source, which is synchronized with intermittent addition of the gas to the shielding gas. Accordingly, displacement amplitude of the arc generation point in the groove of the base metal is expanded or reduced.

According to another broad aspect of the present invention, there is provided a consumable electrode gas shielded arc welding apparatus, comprising a welding torch, a wire supply portion for continuously supplying a welding wire to the welding torch, a shielding gas supply portion for supplying a shielding gas to the welding torch, and a weld electric power source. A gas supply portion, which intermittently adds a gas to the shielding gas is also provided. The added gas has an arc current-voltage characteristic that is different from that of the shielding gas.

With respect to the consumable electrode gas shielded arc welding apparatus, the present invention provides a preferable modification in which change of an external characteristic of the weld electric power source is capable of being synchronized with intermittent addition of the gas to the shielding gas.

EMBODIMENTS

Figure 1:
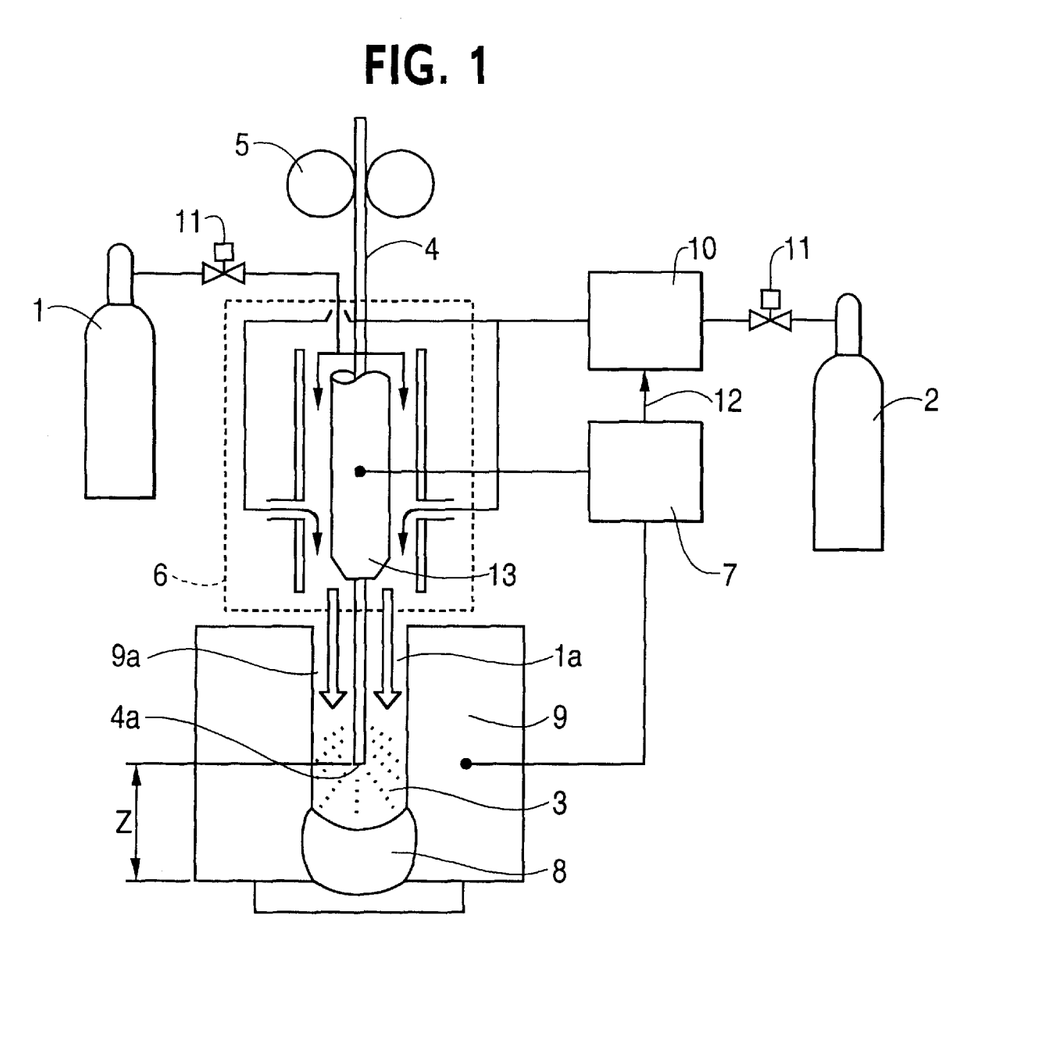
FIG. 1 is a schematic view illustrating a consumable electrode gas shielded arc welding method and apparatus of the present invention.

As illustrated in FIG. 1, for example, in the present invention, a gas (2), having an arc current-voltage characteristic different from that of a shielding gas (1), is intermittently added to the shielding gas from a gas supply portion. The shielding gas (1) is supplied from a shielding gas supply portion, and a chemical composition of thus formed shielding gas (1a) at an arc (3) generation portion is intermittently changed.

Namely, in the present invention, while a welding wire (4) is continuously supplied to a welding torch (6) at a constant rate by a wire supply portion (5), a different kind of a gas (2) is intermittently added to a shielding gas (1) and a chemical composition of the thus provided shielding gas (1a) is intermittently changed at an arc (3) generation portion when arc welding is conducted with shielding gas (1a) in the welding torch (6).

An arc current is controlled by an arc current-voltage characteristic, which depends on a kind of a shielding gas (1a), and an external characteristic of a weld electric power source (7).

In a case where a gas, which exhibits a higher arc voltage characteristic than does a shielding gas for a same arc length, is adopted as the different kind of a gas (2), an arc current is decreased with addition of the different kind of a gas (2) to the shielding gas. Since the welding wire (4) is supplied at a constant rate by the wire supply portion (5), a tip (4a) of the weld wire (4) descends to a side of a weld metal (8), i.e., a bottom of a groove (9a) of a base metal (9). When addition of the different kind of a gas (2) is completed, the arc current increases and therefore the tip (4a) of the welding wire (4) ascends and returns to a position it occupied before addition of the different kind of a gas (2).

In the case where a different gas, which exhibits a lower arc voltage characteristic than does a shielding gas for a same arc length, is adopted as the different kind of a gas (2), a reverse phenomenon takes place.

As described above, in the present invention, an arc current is intermittently changed in proportion to an intermittent chemical composition change of shielding gas (1a) at the arc (3) generation portion and an arc generation point, which is situated at the tip (4a) of the welding wire (4) which is displaced upwardly or downwardly along the groove (9a) of the base metal (9). This up-and-down displacement of the arc generation point along the groove (9a) realizes effective arc heat input density distributions in the groove (9a).

Namely, when the arc generation point is displaced to a bottom of the groove (9a) of the base metal (9), an arc heat input condition is, for example, equal to a concentrated heat resource that is obtained by using 100% $CO_2$ for a shielding gas, and sufficiently strong arc power against an excessively heavy gravity head of molten metal is maintained. The bottom of the groove (9a) is stably molten by application of appropriate heat energy. A so-called large heat input arc welding method is unnecessary and excessively large heat input is avoided.

A condition where the tip (4a) of the welding wire (4) moves to a surface side of the groove (9a) is one of the conditions of MIG welding which is thought to be effective with respect to beads. Consequently, a heat resource obtained is the same one as is dispersed by a cathode cleaning action in the MIG welding. Fine melting occurs and a wetting property at a toe of the beads is preserved.

In the present invention, heat input concentration and dispersion of the arc (3) in the groove (9a) of the base metal (9) can be controlled by intermittent addition of the different kind of a gas (2) to the shielding gas (1), and effective and appropriate arc input distributions are realized in the groove (9). While avoiding excessively large heat input, melting of base metal (9) can be obtained. In addition, heat density as a whole during welding can be reduced. A molten region and a heat affected zone can also be minimized. Accordingly, several properties of the base metal (9) cannot be harmed and a metallic structure can be stably preserved. Reduction of deformation and residual stress will also be possible.

In the present invention, a simple or composite of an inert gas such as He or Ar, or a composite gas in which such an inert gas is a main component and an oxidizing gas such as $O_2$, $CO_2$ or $N_2$ is added, can be adopted as shielding gas (1). An amount of an additive gas can be within a range for MIG or MAG welding, or can be beyond the range for usual MAG welding. A simple or composite of an oxidizing gas such as $O_2$ or $CO_2$ can be adopted as the shielding gas (1).

A simple or composite gas which exhibits a higher or lower arc voltage, as an arc current-voltage characteristic, for a same arc length than does the shielding gas (1), is adopted as a different kind of a gas (2). For example, in the case of a simple or composite of an inert gas, a composite gas which has an inert gas as a main component, or a simple or composite of an oxidizing gas such as an $O_2$, $CO_2$ or $N_2$, a composite gas, in which these gasses are added to an inert gas in an amount greater as compared with that of shielding gas to which those gasses are added, can be provided. In the case where the shielding gas (1) is a simple or composite of an oxidizing gas such as $O_2$ or $CO_2$, or a simple or composite of an inert gas such as He or Ar, a composite gas, in which an inert gas is a main component and an oxidizing gas such as $O_2$, $CO_2$, or $N_2$ is added thereto in a smaller amount as compared with the shielding gas to which those gasses are added, can be provided.

In the case where an oxidizing gas such as $O_2$ or $CO_2$ is used for the shielding gas (1) and the different kind of a gas (2), toughness deterioration of a weld metal (8) may result. But, in the present invention, since the different kind of a gas (2) is intermittently added to the shielding gas (1), average gas pressure (gas concentration) of the oxidizing gas is sufficiently suppressed and therefore toughness deterioration of the weld metal (8) is prevented. Toughness of the weld metal (8) can thus be maintained to be satisfactory.

Figure 2:
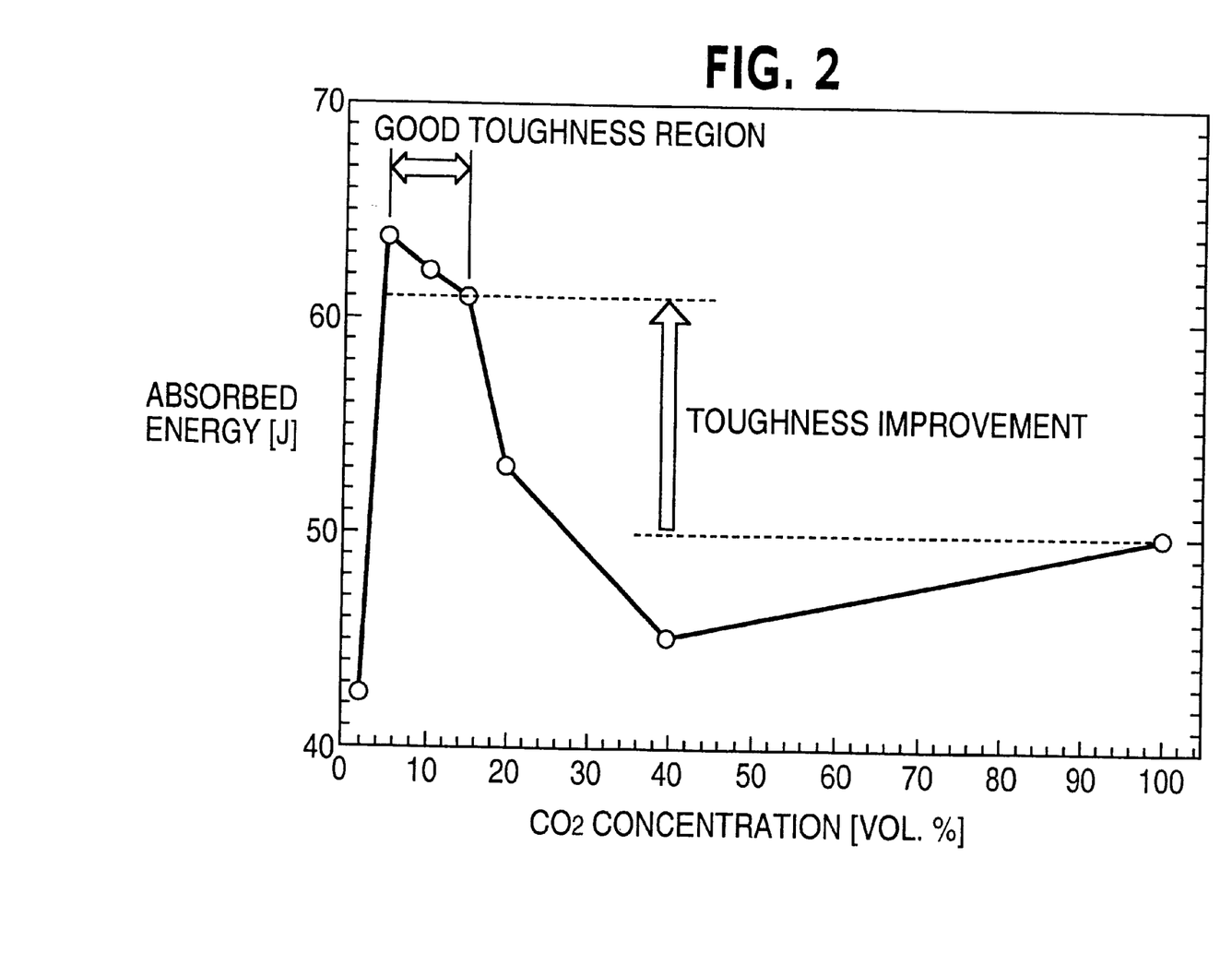
FIG. 2 is a graph which shows a relationship between $CO_2$ concentration in a shielding gas at an arc generation region and absorbed energy of a weld metal when $CO_2$ gas is added to a shielding gas, which is a simple Ar gas, and consumable electrode gas shielded arc welding of the present invention is performed.

As is understood in FIG. 2, in the case of less than 20% of $CO_2$ gas concentration, weld metal toughness is highly maintained. Intermittent addition of $CO_2$ gas, which realizes less than 20% of gas concentration, is realized by an operation in which a flow rate of the $CO_2$ gas is one-fourth of a flow rate of Ar gas.

As illustrated in FIG. 1, a flow rate of the different kind of a gas (2) can be controlled by a flow control portion (10). The flow control portion (10) intermittently adds the different kind of a gas (2) to the shielding gas (1). In addition, the flow control portion (10) can monitor and control a reducing valve and a flow meter (11) which is provided at each of conduits for the shielding gas (1) and the different kind of a gas (2), and therefore the flow control portion (10) can also add the different kind of gas (2) to the shielding gas (1) at appropriate flow rates.

It is preferable that the different kind of gas (2) is partially added to a portion close to the tip (4a) of the welding wire (4) at which the arc (3) generation point is positioned. This is considered to also be important from the point of view that properties of the base metal (9) are stably preserved.

In the present invention, an external characteristic of the weld electric power source (7) can be changed in sychronization with intermittent addition of the different kind of a gas (2) to the shielding gas (1), and thereby variation of an arc current can be increased or decreased. In accordance with the increase or decrease of the arc current variation, displacement amplitude of the arc generation point in the groove (9a) of the base metal (9) is expanded or reduced. Consequently, arc heat input density distributions in the groove (9a) are more appropriate.

For example, in the case where the external property of the weld electric power source (7) is a pulse voltage, when the pulse voltage change is synchronized with addition of the different kind of a gas (2) to the shielding gas (1), variation of an arc current can be increased or decreased by situating a peak of the pulse voltage during the addition of the different kind of a gas (2).

The structure and manner for synchronizing the change of an external property of the weld power source (7) with the intermittent addition of the different kind of a gas (2) to the shielding gas (1) are not specifically restricted. For example, as shown in FIG. 1, the flow control portion (10) can be connected with the weld electric power source (7) through an interface (12). Control of the flow control portion (10) can be synchronized with pulse conditions of the weld electric power source (7).

Examples of a consumable electrode gas shielded arc welding method and apparatus of the present invention will be described as follows:

EXAMPLES

Example 1

Figure 3:
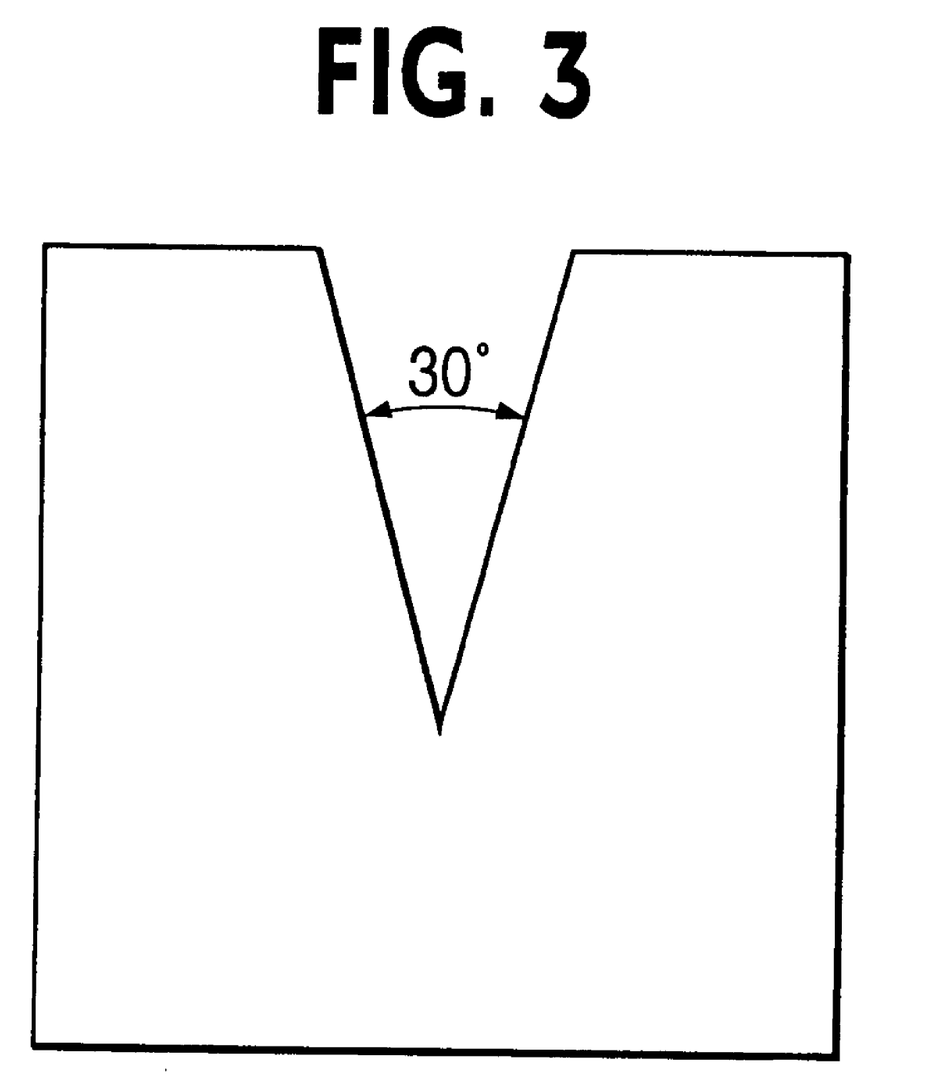
FIG. 3 is an expanded cross sectional view illustrating a groove of a base metal, which was used in Example 1.

A $CO_2$ gas at a flow rate from 3 to 7 liters/min., as a different kind of a gas, was intermittently added at an interval of 0.25 seconds to a shielding gas of Ar having a flow rate of 20 liters/min. Welding was performed in a V-shape groove (mild steel), as illustrated in FIG. 3, with an angle of 30°. A usual electric power source with a constant voltage characteristic was used as a weld electric power source. The welding wire with a diameter of 1.6 mm was used, and its welding speed was 45 cm/min.

A contact tip is one of the parts, which is illustrated as numeral 13 in FIG. 1, and is provided in the welding torch (6). The position of the welding wire tip is illustrated as a symbol, Z, in FIG. 1.

Figure 4A:
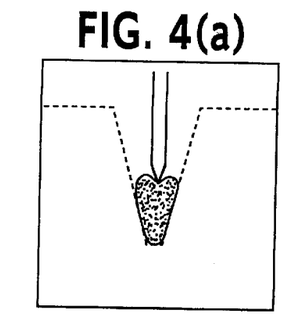
FIGS. 4(a) to 4(g) are observational views illustrating a position of a welding wire tip and behavior of an arc during welding, respectively.
Figure 4B:
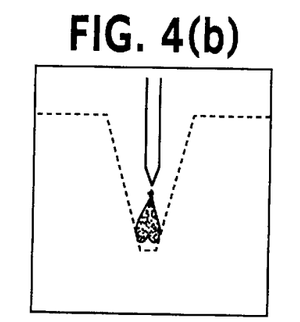

FIG. 4(a) corresponds to a condition where welding was performed with only an Ar gas. No $CO_2$ gas was added to the shielding gas. An arc widely expands in the groove.

When adding a $CO_2$ gas to the shielding gas, a welding wire tip subsequently descends to a bottom of the groove in order from FIGS. 4(b) to 4(e). This phenomenon is based on the following theory.

Figure 5A:
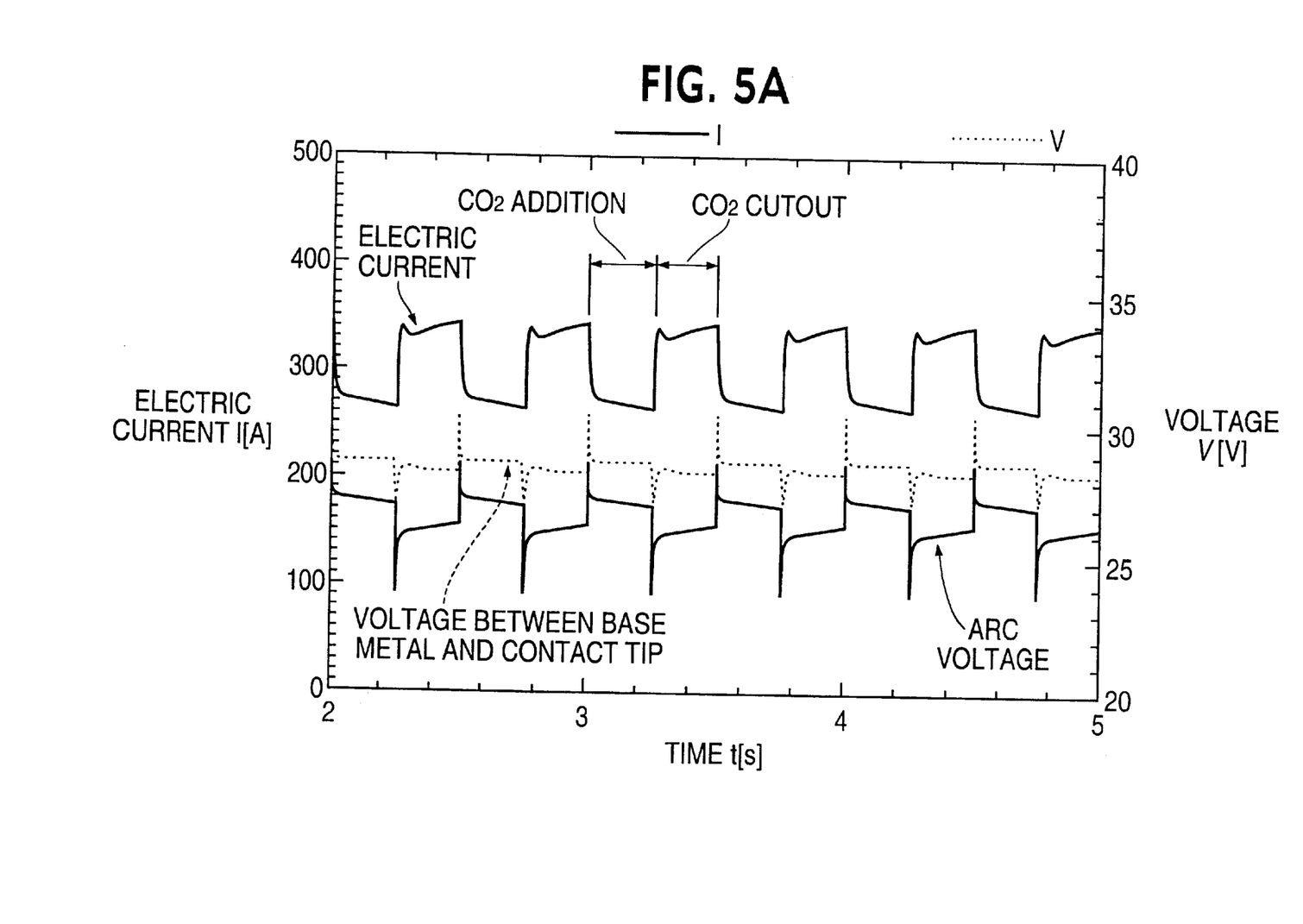
FIGS. 5A and 5B are graphs showing arc currents, arc voltages, voltages between a base metal and a contact tip, and positions of a welding wire tip, respectively.

When the $CO_2$ gas is added to the shielding gas, as illustrated in FIG. 5A, an arc voltage is increased because the $CO_2$ gas is different in an arc current-voltage characteristic and exhibits a higher arc voltage than does Ar gas for the same arc length. Since voltage is changed little in the electric power source with a constant voltage, the increase of the arc voltage causes descent of the welding wire that is situated in the groove. The arc current decreases as illustrated in FIG. 5A. As a result, the molten amount of the welding wire decreases and, as confirmed in FIG. 5B, the welding wire tip descends.

Figure 4C:
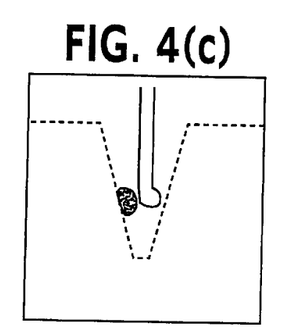
Figure 4D:
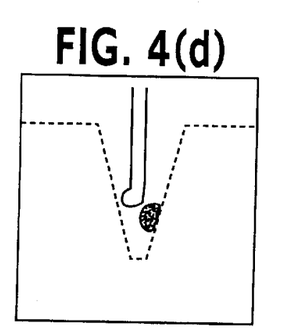
Figure 4E:
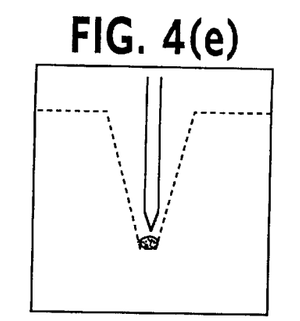

As illustrated in FIGS. 4(c) and 4(d), the arc is generated at the shortest distance from one of the groove walls and a droplet moves to the opposite side of the arc under resiliency of the arc (FIG. 4(c)). As a result, a distance between the droplet and the right side of the groove walls is shortest and the arc is generated at the right side of the groove walls. Accordingly, the droplet further moves to an opposite side of the arc under resiliency of the arc (FIG. 4(d)). Since the movement is repeated, when the movement of the arc is seen as a whole, the arc is uniformly distributed in the groove and therefore one side melting does not occur and groove walls are satisfactorily molten.

Figure 4F:
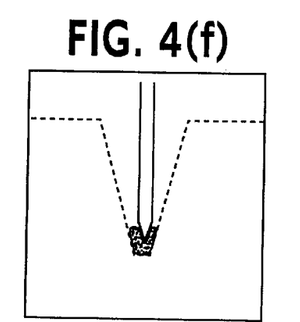
Figure 4G:
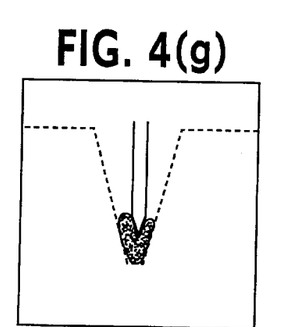

When the $CO_2$ gas is eliminated, as illustrated in FIG. 4(f), the arc is widely generated at the bottom of the groove because the shielding gas is only Ar. As illustrated in FIG. 5A, the arc current increases according to the descent of the arc voltage and the welding wire tip subsequently travels upwardly in order of FIGS. 4(f), 4(g) and 4(a). This is also confirmed in FIG. 5B. When the welding wire tip goes back to the initial position as illustrated in FIG. 4(a), concave beads with a sufficient wetting property are formed. This is based on a cathode cleaning action and is because the arc is generated over the initial arc generation point as illustrated in FIG. 4(a).

Figure 5B:
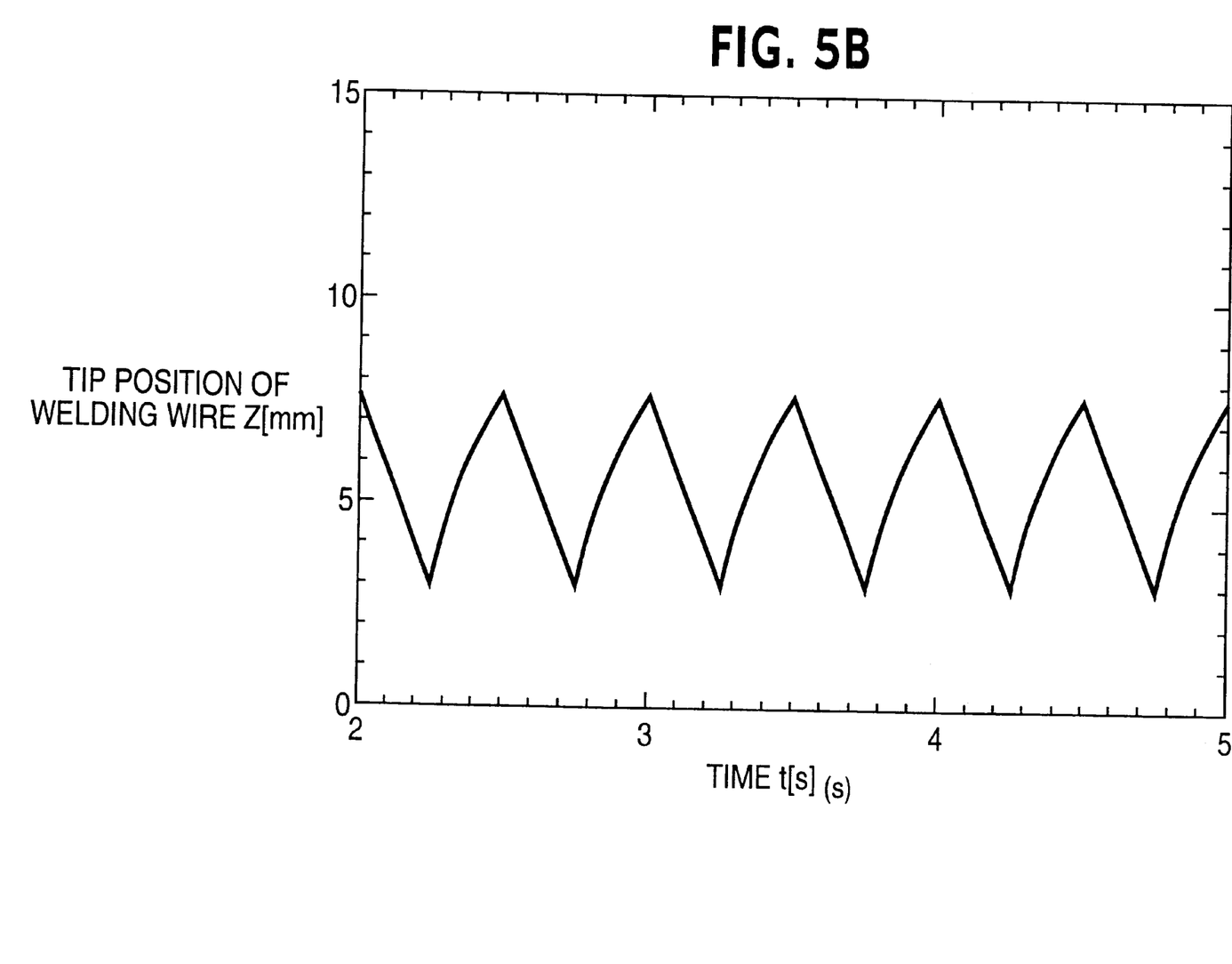

As is seen from FIG. 5B, the tip of the welding wire, and thus the arc generation point, is at most 7.5 mm from the bottom of the groove and at least 3.0 mm from the bottom of the groove.

As described above, concentration and dispersion of arc heat input in the groove were controlled by intermittent addition of a different kind of a gas to the shielding gas, and effective and appropriate arc heat input distributions in the groove were realized. Melting in the groove was sufficiently preserved and heat density as a whole during welding was decreased. Further, a molten region and a heat affected zone were minimized. In addition, average gas pressure (gas concentration) of the $CO_2$ gas could be sufficiently suppressed and weld metal toughness could be kept satisfactory.

Example 2

A constant voltage characteristic, i.e. a varying no-load voltage like a pulse, was selected as an external property of a weld electric power source. As is similar to Example 1, welding was performed while the constant voltage characteristic was changed in synchronization with addition of $CO_2$ to the shielding gas. The arc currents and the positions of the welding wire tip were compared with those in Example 1, in which a voltage characteristic of the weld power source was not changed. The results are shown in graphs of FIGS. 6A, 6B and 6C.

Figure 6A:
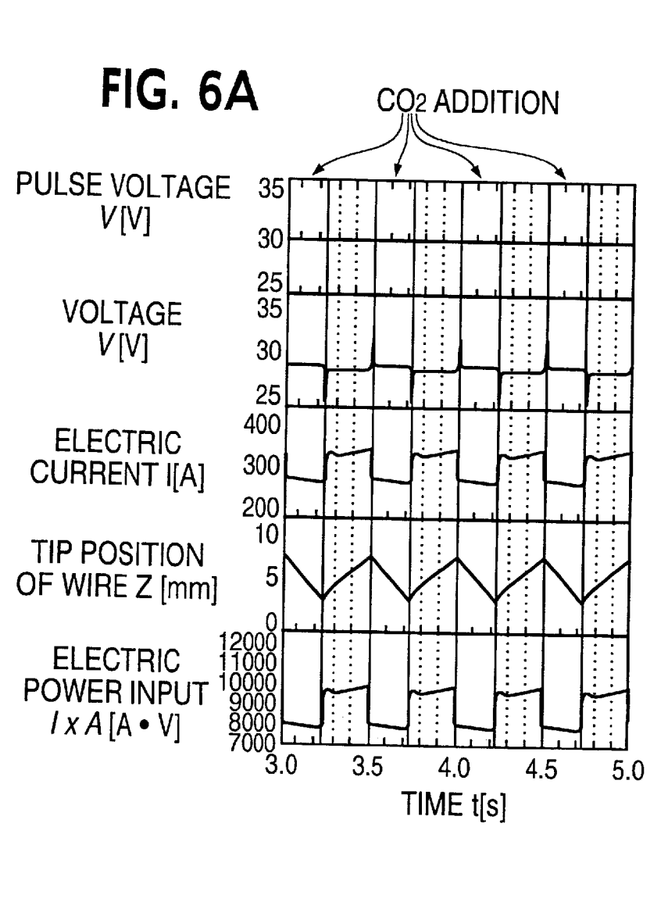
FIGS. 6A to 6C are graphs showing voltages of a weld electric power source, arc voltages, arc currents, positions of a welding wire tip and electric power input, in a case where arc welding was performed with no change of a voltage characteristic of a weld electric power source, in a case where arc welding was performed while a voltage characteristic of the weld electric power source was changed in synchronization with and corresponding to addition of $CO_2$ gas, and in a case where arc welding was performed while the voltage characteristic of the welding electric power source was changed in synchronization with addition of $CO_2$ gas and provided was a pulse cycle phase shift of 0.125 seconds relative to a $CO_2$ gas addition cycle, respectively.
Figure 6B:
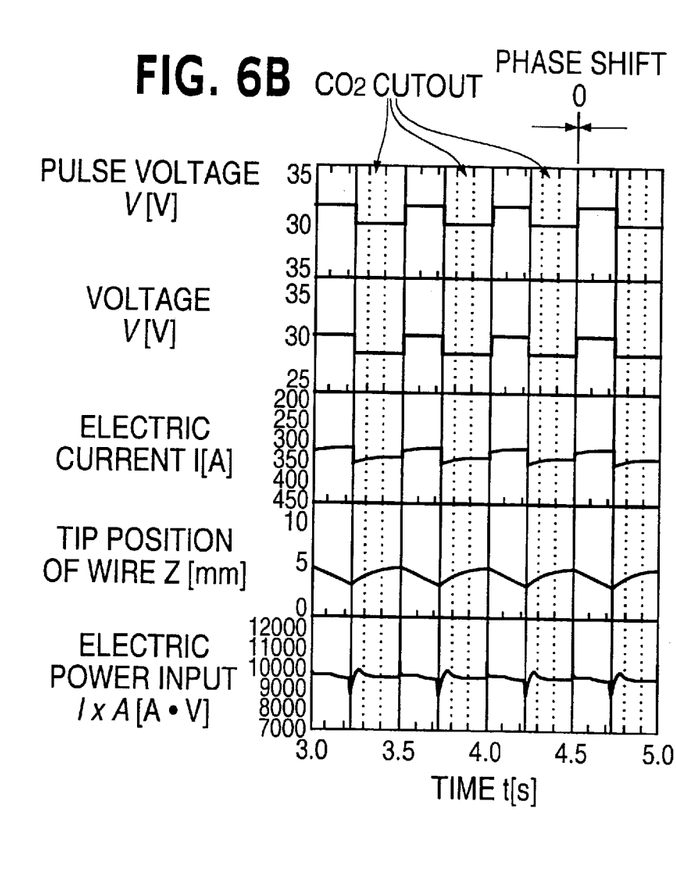
Figure 6C:
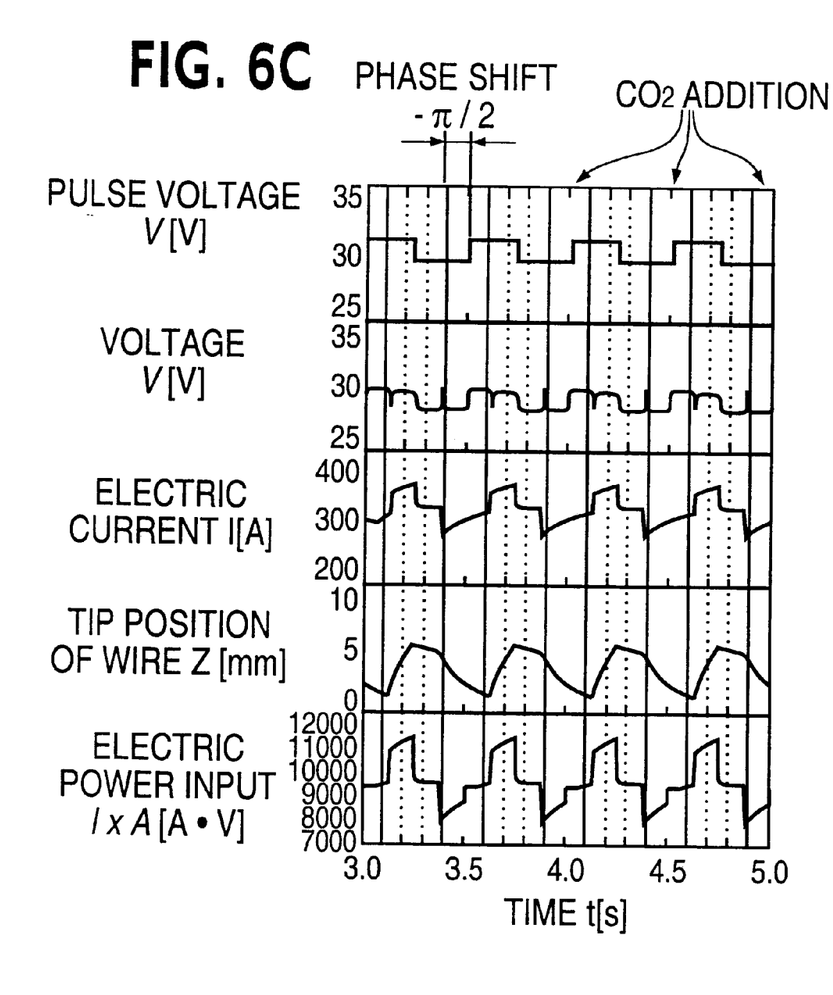

FIG. 6A shows voltages of a weld electric power source, arc voltages, arc currents, positions of a welding wire tip, and electric power input expressed as (electric current)× (voltage) during direct current arc welding in which welding was performed with no change of voltage of the weld electric power source. FIG. 6B shows voltages of a weld electric power source, arc voltages, arc currents, positions of a welding wire tip and electric power input during welding in which a voltage characteristic of a weld electric power source was a pulse voltage with a cycle of 0.25 seconds, which was the same as the cycle of $CO_2$ gas addition to the shielding gas, and the voltage characteristic was changed in synchronization with addition of the $CO_2$ gas and correspondingly with the addition cycle. FIG. 6C shows voltages of a weld electric power source, arc voltages, arc currents, positions of a welding wire tip and electric power input during welding in which a voltage characteristic of a weld electric power source was a pulse voltage with a cycle of 0.25 seconds, which was the same as the cycle of $CO_2$ gas addition to the shielding gas, and the voltage characteristic was changed in synchronization with addition of the $CO_2$ gas and by providing a pulse cycle phase shift of 0.125 seconds with respect to the $CO_2$ gas addition cycle.

As confirmed in comparison of FIGS. 6A to 6C, in the case where a voltage pulse cycle of the weld electric power source was corresponded to the $CO_2$ gas addition cycle (FIG. 6B), i.e., the $CO_2$ gas was added at the peak of the voltage pulse, the highest position of the welding wire tip in the groove moved to the bottom of the groove, but variation of the welding wire tip decreased as compared with direct arc welding (FIG. 6A). When the $CO_2$ gas was eleminated, the welding wire tip moved to an upper portion of the groove and the electric power input expressed as (electric current)× (voltage) was not effectively entered at the bottom of the groove.

On the other hand, in the case where the voltage pulse of the welding electric power source was changed by synchronizing it with $CO_2$ gas addition, and a prescribed phase shift was given to the pulse cycle (FIG. 6C), both the highest position and the lowest position of the welding wire tip in the groove moved to the bottom of the groove as compared with the direct current arc welding (FIG. 6A), and displacement amplitude ($\Delta Z$) was maximized. When the welding wire tip was situated at the bottom of the groove for about 3.5 to 3.7 seconds, the electric power input was larger than that in the case of FIGS. 6A and 6B. Heat effectively entered the bottom of the groove and penetration of the bottom was maintained.

From these facts, it is understood that displacement amplitude of the arc generation point in the groove can be expanded by changing an external property of a weld electric power source while synchronizing therewith intermittent addition of a different kind of a gas to a shielding gas, and by increasing variation of an arc current. Accordingly, appropriate arc heat input density distributions in the groove can be obtained.

The present invention is not limited to embodiments and examples above-mentioned. Various modifications are possible.

What is claimed is:

1. A consumable electrode gas shielded arc welding method, comprising:

intermittently adding to a shielding gas a different gas having an arc current-voltage characteristic that is different than that of said shielding gas;

intermittently changing an arc current in proportion to an intermittent chemical composition change of said shielding gas at an arc generation region; and displacing, along a groove defined by base metal, an arc generation point at a tip of a welding wire toward and away from a bottom of said groove such that said arc generation point is at most 7.5 mm from said bottom of said groove and at least 3.0 mm from said bottom of said groove.

2. The method according to claim 1, wherein displacing said arc generation point toward and away from said bottom of said groove comprises displacing said arc generation point upwardly and downwardly.

3. The method according to claim 2, wherein said shielding gas or said different gas comprises an oxidizing gas or helium.

4. The method according to claim 3, further comprising increasing or decreasing variation of said arc current by changing an external characteristic of an electric power source in synchronization with the intermittently adding of said different gas to said shielding gas, thereby increasing or decreasing a displacement amplitude of said arc generation point in said groove.

5. The method according to claim 2, further comprising increasing or decreasing variation of said arc current by changing an external characteristic of an electric power source in synchronization with the intermittently adding of said different gas to said shielding gas, thereby increasing or decreasing a displacement amplitude of said arc generation point in said groove.

6. The method according to claim 1, further comprising increasing or decreasing variation of said arc current by changing an external characteristic of an electric power source in synchronization with the intermittently adding of said different gas to said shielding gas, thereby increasing or decreasing a displacement amplitude of said arc generation point in said groove.

7. The method according to claim 1, wherein said shielding gas or said different gas comprises an oxidizing gas or helium.

8. The method according to claim 7, further comprising increasing or decreasing variation of said arc current by changing an external characteristic of an electric power source in synchronization with the intermittently adding of said different gas to said shielding gas, thereby increasing or decreasing a displacement amplitude of said arc generation point in said groove.

* * * * *